United States Patent
Hills et al.

(10) Patent No.: US 12,415,682 B2
(45) Date of Patent: Sep. 16, 2025

(54) MULTI-LEVEL TRAY LOADER

(71) Applicant: Dematic Corp., Grand Rapids, MI (US)

(72) Inventors: Jared Hills, Lowell, MI (US); Dean Leek, Caledonia, MI (US); Matthew Bair, Caledonia, MI (US); Nolan R. Pilarz, Ada, MI (US)

(73) Assignee: Dematic Corp., Grand Rapids, MI (US)

( * ) Notice: Subject to any disclaimer, the term of this patent is extended or adjusted under 35 U.S.C. 154(b) by 95 days.

(21) Appl. No.: 18/307,424

(22) Filed: Apr. 26, 2023

(65) Prior Publication Data

US 2023/0339696 A1 Oct. 26, 2023

Related U.S. Application Data

(60) Provisional application No. 63/334,834, filed on Apr. 26, 2022.

(51) Int. Cl.
*B65G 47/52* (2006.01)
*B65G 47/04* (2006.01)

(52) U.S. Cl.
CPC ...... *B65G 47/04* (2013.01); *B65G 2201/0258* (2013.01); *B65G 2207/46* (2013.01)

(58) Field of Classification Search
None
See application file for complete search history.

(56) References Cited

U.S. PATENT DOCUMENTS

| | | | | |
|---|---|---|---|---|
| 3,037,608 A | * | 6/1962 | Rothschild | B65G 47/57 198/774.3 |
| 3,677,423 A | * | 7/1972 | Tollefsrud | B65G 47/642 198/300 |
| 3,805,478 A | * | 4/1974 | Stohlquist | B65B 35/44 53/73 |
| 3,913,725 A | * | 10/1975 | Harrison | B65G 47/50 198/449 |
| 4,181,212 A | * | 1/1980 | Hinchcliffe | A24C 5/352 198/429 |
| 4,896,474 A | * | 1/1990 | Osteen | B65B 5/068 53/246 |

(Continued)

FOREIGN PATENT DOCUMENTS

EP 0496992 A1 8/1992

OTHER PUBLICATIONS

International Search Report and Written Opinion from corresponding Patent Cooperation Treaty (PCT) Application No. PCT/IB23/54320, completed Jul. 7, 2023 and mailed Sep. 27, 2023.

*Primary Examiner* — Joseph A Dillon, Jr.
(74) *Attorney, Agent, or Firm* — Gardner, Linn, Burkhart & Ondersma LLP

(57) ABSTRACT

A system and method are provided for loading trays with articles using a first tray conveyor on which empty trays are delivered and an article conveyor on which articles are delivered to be transferred onto empty trays. The trays include a frame with a peripheral raised edge and a base having at least one aperture and a transport plate for the articles, the transport trays being positioned on the base of the frame. A lifting apparatus is provided for the transport plate of the tray at a height that is about equal to the height of the article conveyor, such as about 10 millimeters (10 mm) or less to reduce or eliminate drop forces as articles as transferred from the article conveyor onto the tray.

14 Claims, 9 Drawing Sheets

(56) References Cited

U.S. PATENT DOCUMENTS

| | | | | |
|---|---|---|---|---|
| 5,070,992 | A | 12/1991 | Bonkowski | |
| 5,626,101 | A * | 5/1997 | Kuhl | G06M 1/101 |
| | | | | 119/845 |
| 5,673,783 | A * | 10/1997 | Radant | B65B 5/101 |
| | | | | 198/418.6 |
| 6,279,721 | B1 * | 8/2001 | Lyngso | B64F 1/368 |
| | | | | 198/465.1 |
| 7,089,717 | B2 * | 8/2006 | Guttinger | B65G 47/57 |
| | | | | 53/448 |
| 8,763,785 | B2 | 7/2014 | Schwardt et al. | |
| 9,457,966 | B2 * | 10/2016 | Issing | B65G 1/06 |
| 10,696,503 | B2 * | 6/2020 | Porat | B65G 69/22 |
| 10,894,686 | B2 * | 1/2021 | Yang | B65H 31/08 |
| 11,198,566 | B2 * | 12/2021 | Bretz | B65G 17/002 |
| 11,219,924 | B2 * | 1/2022 | Tetaz-Receveur | B07C 3/008 |
| 2008/0017478 | A1 * | 1/2008 | Honeycutt | B65G 1/00 |
| | | | | 198/468.01 |
| 2011/0308918 | A1 | 12/2011 | Schwardt et al. | |
| 2013/0062160 | A1 * | 3/2013 | Steinbach | B65G 65/00 |
| | | | | 198/370.03 |
| 2013/0075230 | A1 | 3/2013 | Tiebel et al. | |
| 2022/0055843 | A1 | 2/2022 | Bair et al. | |
| 2022/0315256 | A1 * | 10/2022 | Storhas | B65B 43/46 |
| 2025/0066126 | A1 * | 2/2025 | Schedlbauer | G05B 19/41895 |

* cited by examiner

MULTI-LEVEL TRAY LOADER

CROSS REFERENCE TO RELATED APPLICATION

This application claims the benefit of U.S. Prov. Pat. Appl. Ser. No. 63/334,834, filed Apr. 26, 2022.

FIELD OF THE INVENTION

The present invention is directed to a material handling system, and in particular a fragile article handling system.

BACKGROUND OF THE INVENTION

The invention relates to systems and methods for loading trays onto articles in a conveyor system. Systems and methods of this type are used for automatic loading of trays loaded with articles, wherein the loading process is carried out during ongoing conveyor movement, incorporated into supply and discharge conveyor technology. Trays are often used in automatic storage and picking systems. These trays allow articles, which are often highly dissimilar in their dimensions and/or material properties, to be handled in logistics systems quickly and in a controlled and uniform manner in spite of this dissimilarity in the articles.

SUMMARY OF THE INVENTION

The present invention provides a tray loading system for loading trays with fragile product (i.e. fresh produce, such as tomatoes, glass products, and other products poorly suited for drop impacts) onto trays and thus enables the loading of hard to handle and/or fragile products in a material handling system.

According to one form of the present invention, a tray loading system is provided for loading articles onto trays in a material handling conveyor system. The tray loading system includes a first or upstream tray conveyor for transporting material handling transport trays. The trays utilized in the material handling conveyor system each include a frame having a peripheral raised edge and a base having at least one aperture. A transport plate with a transport surface for supporting articles is supportable on the base of the tray frame. The transport plate and is moveable relative to the raised edge and base of the frame. The system includes a transfer bed downstream of the first tray conveyor and configured to receive a tray from the first tray conveyor. The system also includes an article conveyor upstream of the transfer bed and adjacent to the first tray conveyor, such as above or alongside the first tray conveyor. The article conveyor transports articles nearby the transfer bed where the article is then transferrable from the conveyor surface of the article conveyor onto the transport surface of a transport tray. The system includes a second tray conveyor downstream of the transfer bed and operable to transport trays away from the transfer bed. The transfer bed is operable to position the tray in a substantially level orientation in which the transport plate of the tray is at or above the raised edge of the tray frame such that the transport surface of the transport plate is substantially parallel with the conveyor surface of the article conveyor. The transfer bed is operable to position the tray such that the base of the tray is substantially parallel to a conveyor surface of a downstream tray conveyor.

In one aspect, the transfer bed is pivotable about a horizontal axis and operable to move between: (i) a horizontal orientation in which the transport plate of a tray supported at the transfer bed is horizontal and substantially parallel with the conveyor surface of the article conveyor to receive an article from the article conveyor with about five millimeters (5 mm) or less drop to the transport plate; and (ii) an oblique orientation in which the transport plate of a tray supported at the transfer bed is obliquely oriented relative to horizontal and substantially parallel with the conveyor surface of the second tray conveyor to transfer the tray from the transfer bed to the second tray conveyor.

In another aspect, the transfer bed includes a lift apparatus to position the transport plate of a horizontally orientated tray supported on a transport surface of the transfer bed at or above the peripheral raised edge of the frame of the tray. The lift apparatus may include a plurality of support elements fixed relative to the first tray conveyor and the article conveyor and configured to reach through the transport surface of the transfer bed and through the aperture in the tray as the frame of the tray is lowered relative to the support elements. As such, the frame lowers relative to the transport plate of the tray.

In yet another aspect, the transfer bed includes a lift apparatus operable to lift the transport plate of a horizontally orientated tray supported on the transfer bed to a position substantially coplanar to the conveyor surface of the article conveyor such that the transport plate is positioned to receive an article from the article conveyor with five millimeters (5 mm) or less drop to the transport plate. The lift apparatus includes a plurality of vertically moveable support elements operable to reach through the transport surface of the transfer bed and the aperture in the tray such that as the plurality of support elements raise, they lift the transport plate of the tray supported at the transfer bed above the peripheral raised edge of the tray and the frame of the tray remains on the transport surface of the transfer bed.

In another form of the present invention, a method is provided for loading a material handling transport tray in a material handling conveyor system. The method includes providing a first tray conveyor, an article conveyor adjacent the first tray conveyor, a tray, and a transfer bed to receive the tray from the first tray conveyor. The tray includes a frame having a peripheral raised edge and a base having at least one aperture, and a transport plate with a transport surface for supporting articles, where the transport plate is supportable on the base of the frame for transport and is moveable relative to the raised edge and base of the frame. The method includes delivering a tray with the first tray conveyor to the transfer bed and then positioning the transport plate of the tray at the transfer bed such that the transport surface of the transport plate is less than about ten millimeters (10 mm) below the conveyor surface of the article conveyor. An article is transferred from the conveyor surface of the article conveyor to the transport surface of the transport plate of the tray at the transfer bed. The loaded tray is transferred away from the transfer bed. The loaded tray may be transferred to a second tray conveyor downstream of the transfer bed.

Accordingly, systems and methods are provided for loading fragile articles onto trays with minimal drop distances such that the articles experience minimal impact, which may otherwise damage the articles, such as fragile produce, for example. The systems include lifting apparatuses to position movable transport plates of trays at a height that is at or about equal to the height of a supply conveyor delivering the articles to the tray.

These and other objects, advantages, purposes, and features of this invention will become apparent upon review of the following specification in conjunction with the drawings.

DESCRIPTION OF THE PREFERRED EMBODIMENTS

Figure 1:
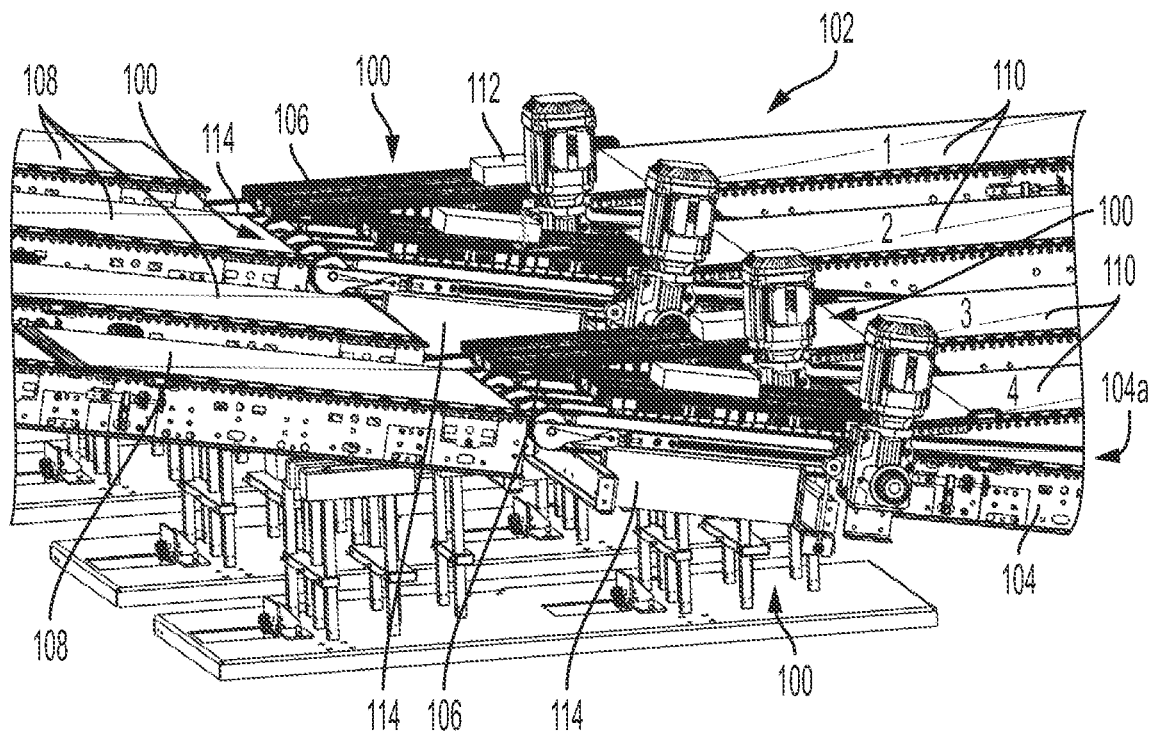
FIG. 1 is a side perspective view of a plurality of tray loading systems for a material handling facility, in accordance with the present invention, with two tray loading systems in an oblique orientation and two tray loading systems in a horizontal orientation.

Referring now to the drawings and the illustrative embodiments depicted therein, a tray loading system is provided for material handling systems that utilize transport trays with false bottoms. The tray loading system is provided for reducing or eliminating impacts to fragile articles or items, such as soft produce or glass products, as the items are loaded onto a transport tray. The configuration of the tray loading system enables the transfer of items from an article conveyor to a transport tray with a minimal or very small amount of drop from the article conveyor to a transport surface of the transport tray. Various configurations of the tray loading system are contemplated, including configurations having pivotable tray transfer beds, a tray transfer bed with a vertical lifting apparatus or lift, and a lateral transfer apparatus or pusher to move articles toward a tray transfer bed.

Referring to the illustrative embodiments of FIGS. 1-4, a tray loading system 100 is provided for a material handling system 102 having a first or upstream tray conveyor 104 for transporting material handling transport trays 106, a second or downstream tray conveyor 108 for transporting trays 106, and an upstream article conveyor 110 for transporting articles or items 112, such as fragile produce or glass products. The tray loading system 100 includes a transfer bed 114 for facilitating a transfer of an article 112 from the article conveyor 110 to a tray 106 supported at the transport surface of the transfer bed 114. The upstream tray conveyor 104 delivers trays 106 to the transfer bed 114 and the downstream tray conveyor 108 transports trays 106 away from the transfer bed 114.

Figure 5:
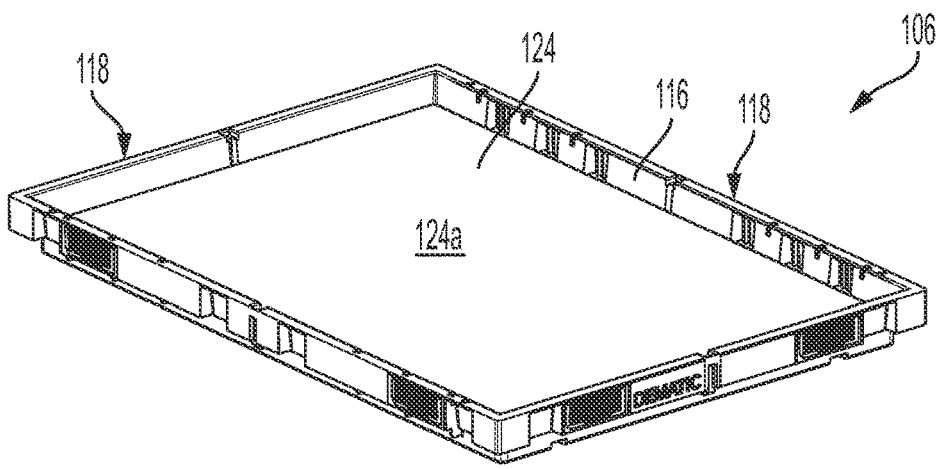
FIG. 5 is a top side perspective view of a transport tray for use in a material handling system.
Figure 6:
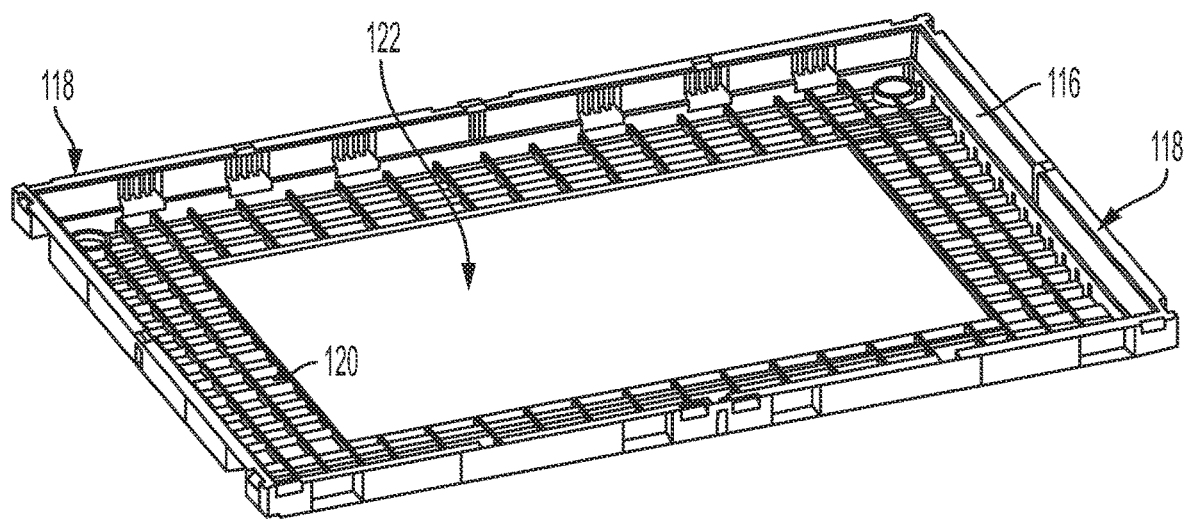
FIG. 6 is another top side perspective view of the transport tray of FIG. 5.
Figure 7:
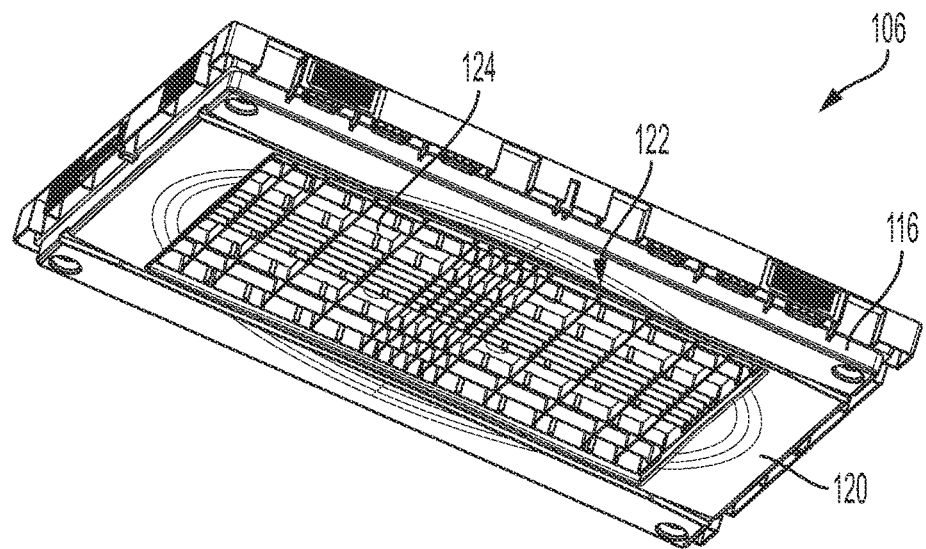
FIG. 7 is a bottom perspective view of the transport tray of FIG. 5.

The trays 106 utilized in the material handling system 102 may have structure that is similar or substantially identical to and function in similar manner as the trays disclosed in commonly owned and assigned U.S. Pat. No. 8,763,785, issued Jul. 1, 2014 to Dematic GmbH of Offenbach, Germany, and/or commonly owned and assigned U.S. Patent Application Pub. No. 2022/0055843A1, which was published on Feb. 24, 2022, the disclosures of which is hereby incorporated herein by reference in their entireties. Referring to FIGS. 5-7, the trays 106 each include a frame 116 provided with a peripheral raised edge 118 and a base 120 having a central aperture 122 extending in the longitudinal direction. The tray 106 has a comparatively thin flat transport plate 124 for supporting articles 112. The plate 124 lies on or is supportable at the base 120, such that the plate 124 is moveable relative to the frame 116. The plate 124 includes a transport surface 124a for supporting articles 112.

Figure 2:
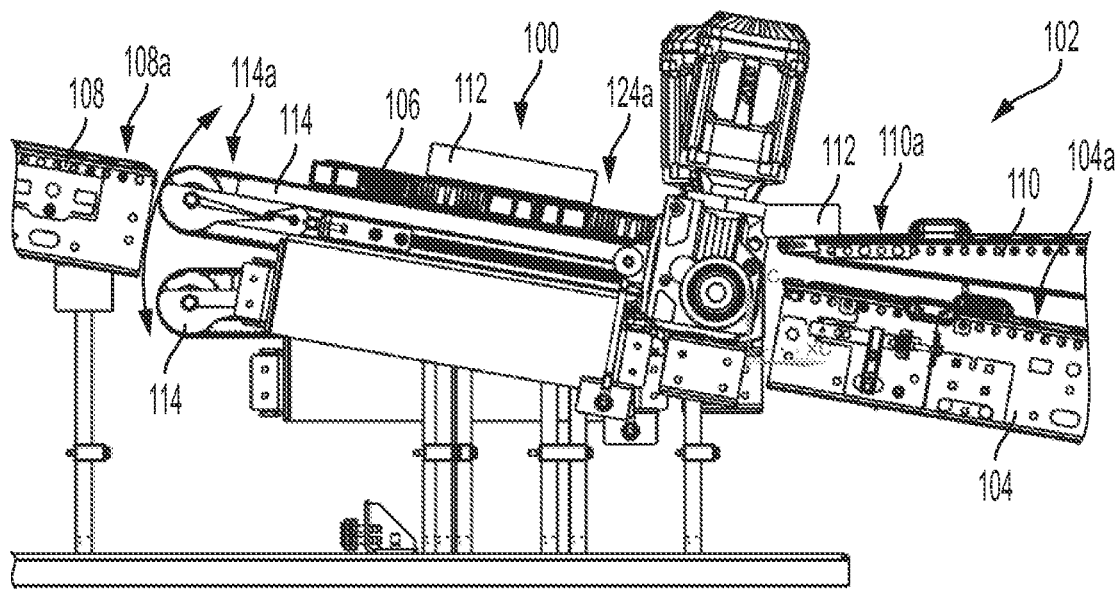
FIG. 2 is a side elevation view of the tray loading systems of FIG. 1.
Figure 3:
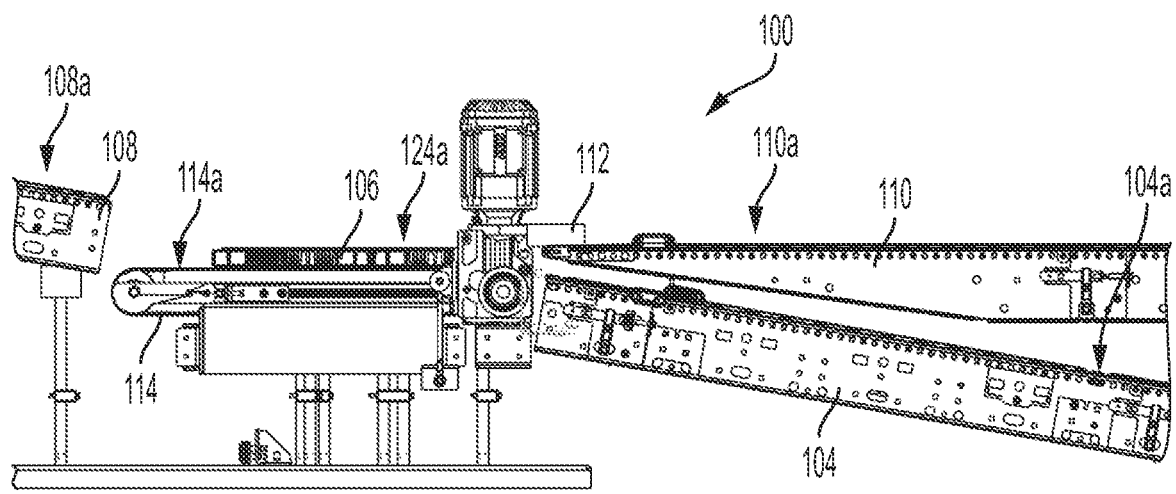
FIG. 3 is another side elevation view of the tray loading systems of FIG. 1, depicted with all of the tray loading systems in a horizontal orientation.
Figure 4:
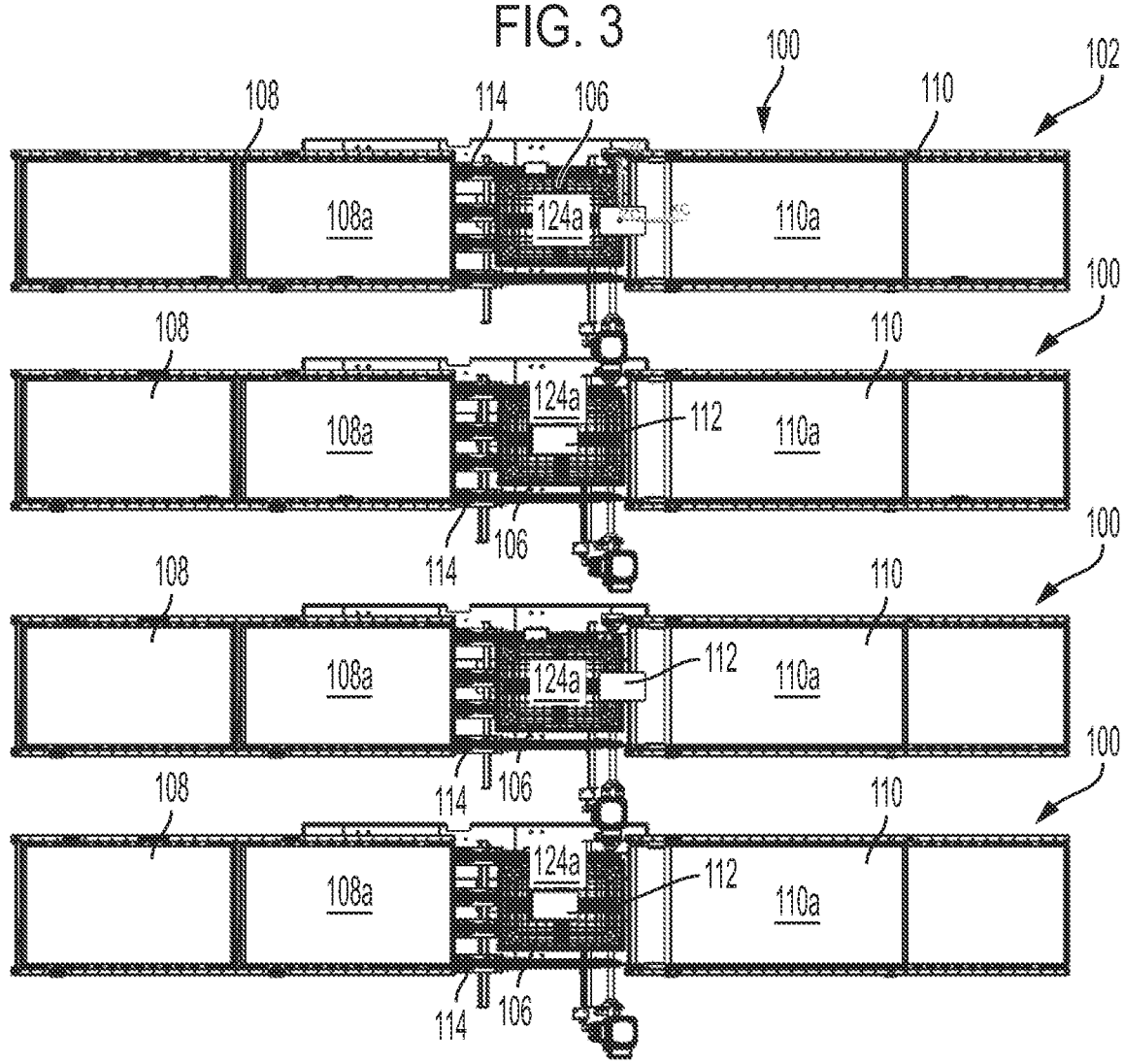
FIG. 4 is a top plan view of the tray loading systems of FIG. 1.

The transfer bed 114 is positioned downstream of the upstream tray conveyer 104 and includes a transport or support surface 104a for supporting the frame 116 of a tray 106 at the transfer bed 114. In the illustrated embodiment of FIGS. 1-4, the upstream tray conveyor 104 is oriented at an oblique angle relative to horizontal, such that a tray 106 on conveyer 104 approaches the transfer bed 114 in a slightly upward direction. The transfer bed 114 is pivotable about a horizontal axis at an upstream edge or end that is adjacent the upstream tray conveyor 104 and the article conveyor 110. The article conveyor 110 is oriented in a substantially horizontal plane and the downstream tray conveyor 108 is oriented at an oblique angle relative to horizontal, and optionally at an identical angle as the upstream tray conveyor 104. The transfer bed 114 is pivotable between a horizontal or level orientation as best shown in FIG. 3 and an oblique or angled orientation as best shown in FIG. 2. In the horizontal orientation, the transport surface 114a of the transfer bed 114 is oblique the conveyor surfaces 104a and 108a of the upstream and downstream tray conveyors 104 and 108 and is generally parallel and subjacent to the conveyor surface 110a of the article conveyor 110 (FIG. 3). In the oblique orientation, the transport surface 114a is transfer bed 114 is generally parallel and coplanar with the conveyor surfaces 104a and 108a of the upstream and downstream tray conveyors 104 and 108 (FIG. 2).

The transfer bed 114 includes a lift or lifting apparatus, in the form of a plurality of stationary or fixed monoliths, blocks, or support elements that extend or reach through openings or voids in the transport surface 114a of the transfer bed 114 when the transfer bed is in the horizontal orientation. The lift apparatus is provided to lift or otherwise position the transport plate 124 of a tray 106 supported on the transfer bed 114 at a receiving position that is substantially coplanar to the conveyor surface 110a of the article conveyor 110. The transfer bed 114 pivots relative to the support elements such that as the transfer bed 114 is lowered to the horizontal orientation, the support elements extend at least partially above the transport surface 114a of the transfer bed 114. In this manner, as the transfer bed 114 and the tray 106 supported thereon lower, the support elements contact the plate 124 of the tray 106 and extend or reach through the aperture 122 of the frame 116 and the frame 116 continues to lower relative to the transport plate 124. The transfer bed 114 may include a tray stop or tray positioning apparatus for positioning the tray in an acceptable position such that the support elements may engage the transport plate 124 of the tray 106 without engaging, colliding, or interfering with the frame 116 while the support elements reach/extend through the aperture 122. The lift apparatus of transfer bed 114 may be similar or substantially identical in structure and function to the exemplary de-traying apparatus disclosed in previously mentioned U.S. Patent Application Pub. No. 2022/0055843A1, the disclosure of which is hereby incorporated herein by reference in its entirety.

The support elements are positioned such that when the transport plate 124 is wholly supported by and resting on the support elements the transport plate 124 is positioned in the receiving position in which the transport surface 124a of the plate is horizontal and substantially parallel with the conveyor surface 110a of the article conveyor 110. The height of the transport surface 124a of the transport plate 124 in the receiving position is set in order to reduce or substantially eliminate impact forces to articles 112 as they transfer from the transport surface 110a of article conveyor 110 to the tray 106. Optionally, the height difference between the transport surface 124a of the transport plate 124 and the conveyor surface 110a of the article conveyor 110 is about ten millimeters (10 mm) or less such that the article 112 drops ten millimeters or less to the tray 106. Optionally, the height difference is about five millimeters (5 mm) or less such that the article 112 drops five millimeters or less to the tray 106. In the receiving position, the transport surface 124a of the transport plate 124 is at or above the raised edge 118 of the frame 116 of the tray 106. With the transfer bed 114 in the oblique orientation, a tray 106 supported at the transfer bed 114 is positioned in a transport position in which the transport plate 124 of the tray is supported on the base 120 of the frame 116 of the tray 106 (i.e. the transport surface 124a of the plate is below the raised edge 118 of the frame 116).

The tray loading system 100 is operable to load a tray 106 in the following manner. A tray 106 is conveyed along the upstream tray conveyor 104 and then transferred from the conveyor surface 104a to the transfer bed 114 with the transfer surface 114a in the oblique orientation. Once the tray is substantially supported on the transfer bed 114, the transfer bed 114 pivots downward from the oblique position shown in FIG. 2 to the horizontal position shown in FIG. 3. While lowering, the transport plate 124 engages or comes to rest on the fixed support elements of the lifting apparatus and the tray frame 116 continues to lower. With the transport plate 124 in the receiving position, the article conveyor 110 transports and then transfers an article 112 from the conveyor surface 110a to the transport surface 124a of the 106. With the article supported at the transport plate 124, the transfer bed 114 raises from the horizontal orientation to the oblique orientation and the base 120 of the tray frame 116 engages the transport plate 124. With the tray 106 in the transport position the transfer bed 114 transfers the tray 106 with the article 112 from the transport surface 114a to the transport surface 108a of the downstream tray conveyor 108 which then transports the tray away from the transfer bed 114. The transfer bed 114 is then ready to receive an empty tray 106 from the upstream conveyor 104 for loading of another article 112.

Figure 8:
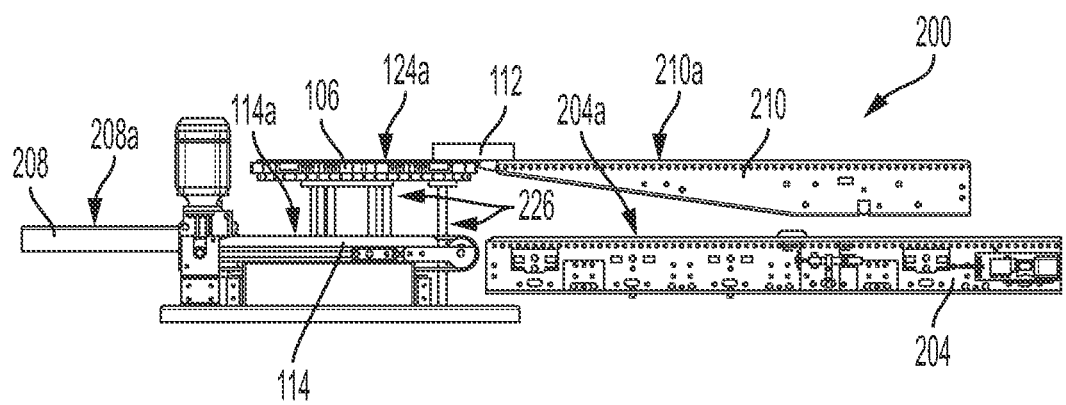
FIG. 8 is a side elevation view of another tray loading system in accordance with the present invention, depicted with a lift apparatus in a lifted or raised position.
Figure 9:
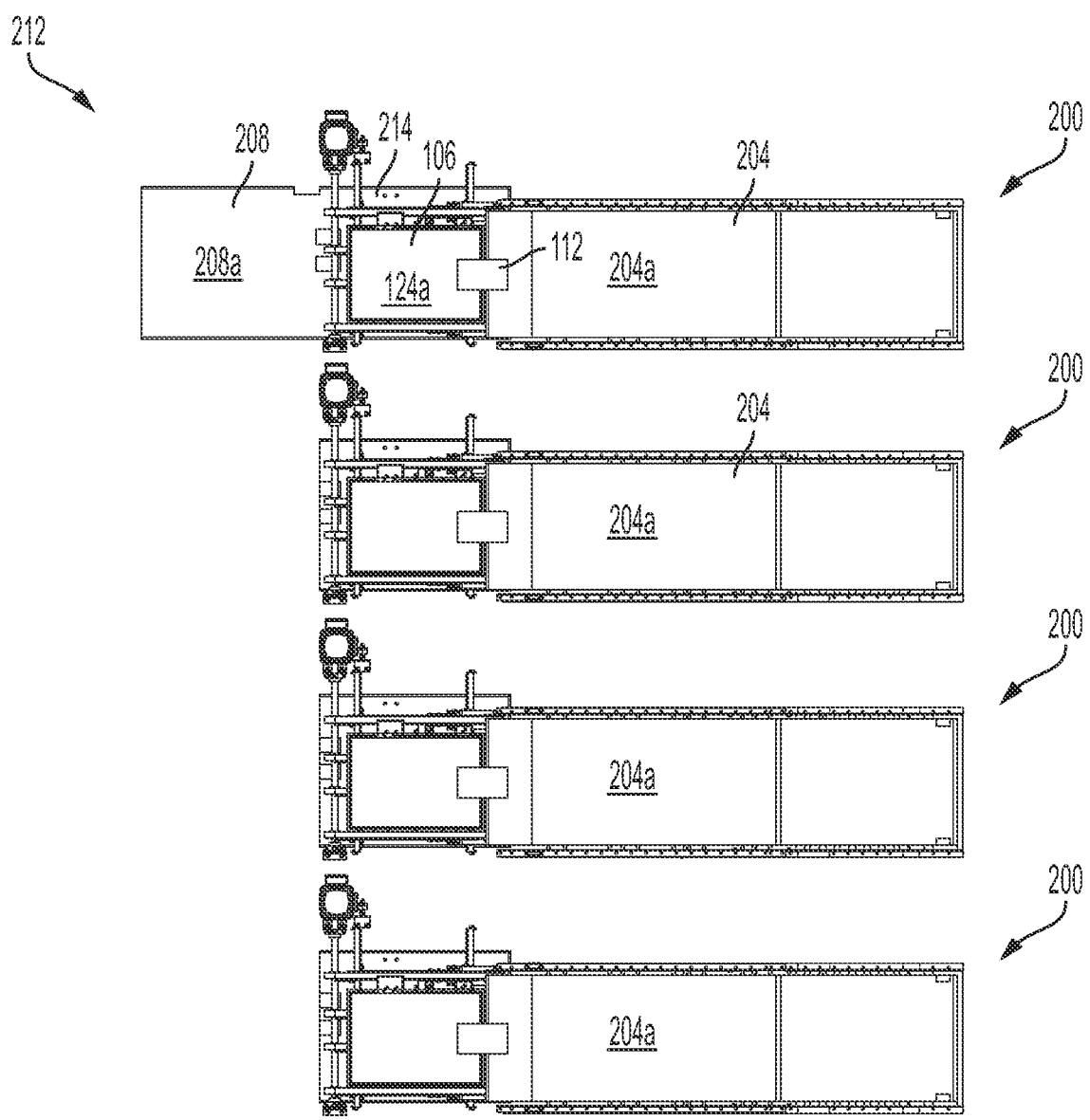
FIG. 9 is a top plan view of a plurality of the tray loading systems of FIG. 8.

Referring to the illustrative embodiments of FIGS. 8-9, a tray loading system 200 is provided for a material handling system 202 having a first or upstream tray conveyor 204 for transporting material handling transport trays 106 (as previously described above and illustrated in FIGS. 5-7), a second or downstream tray conveyor 208 for transporting trays 106, and an upstream article conveyor 210 for transporting articles or items 112. The tray loading system 200 includes a transfer bed 214 for facilitating a transfer of an article 112 from the article conveyor 210 to a tray 106 supported at the transport surface 214a of the transfer bed 214. The upstream tray conveyor 204 delivers trays 206 to the transfer bed 214 and the downstream tray conveyor 208 transports trays 106 away from the transfer bed 214.

The transfer bed 214 is positioned downstream of the upstream tray conveyer 204 and includes a transport or support surface 214a for supporting the frame 216 of a tray 106 at the transfer bed 214. In the illustrated embodiment of FIGS. 8-9, the upstream tray conveyor 204, downstream tray conveyor 208, and article conveyor 210 are each oriented horizontally. The transport surface 214a of transfer bed 214 is generally parallel and coplanar with the conveyor surfaces 204a and 208a of the upstream and downstream tray conveyors 204 and 208 (FIG. 8).

The transfer bed 214 includes a lift apparatus, in the form of a plurality of vertically movable support elements 226 that are raiseable to extend or reach through openings or voids in the transport surface 214a of the transfer bed 214 to engage the transport plate 124 of the tray 106 through the aperture 122 (FIG. 8). The support elements 226 are provided to lift the transport plate 124 of a tray 106 supported on transfer bed 214 to a receiving position that is substantially coplanar to the conveyor surface 210a of the article conveyor 210 (FIG. 8). As the support elements 226 raise they lift the transport plate 124 of the tray 106 above the peripheral raised edge 118 of the tray 106 and the frame 116 of the tray remains on the transport surface 214a of the transfer bed 214.

The support elements are operable to position the transport plate 124 at the receiving position in which the transport surface 124a of the plate is horizontal and at or about coplanar with the conveyor surface 210a of the article conveyor 210. The height of the transport surface 124a of the transport plate 124 in the receiving position is set in order to reduce or substantially eliminate impact forces to articles 112 as they transfer from the transport surface 210a of article conveyor 210 to the tray 106. Optionally, the height difference between the transport surface 124a of the transport plate 124 and the conveyor surface 210a of the article conveyor 210 is about ten millimeters (10 mm) or less such that the article 112 drops ten millimeters or less to the tray 106. Optionally, the height difference is about five millimeters (5 mm) or less such that the article 112 drops five millimeters or less to the tray 106. In the receiving position, the transport surface 124a of the transport plate 124 is substantially above the raised edge 118 of the frame 116 of the tray 106. With the lifting apparatus 226 at transfer bed 214 lowered, a tray 106 supported at the transfer bed 214 is positioned in a transport position in which the transport plate 124 of the tray is supported on the base 120 of the frame 116 (i.e. the transport surface 124a of the plate is below the raised edge 118 of the frame 116). The lift apparatus of transfer bed 214 may be similar or substantially identical in structure and function to the exemplary de-traying apparatus disclosed in previously mentioned U.S. Patent Application Pub. No. 2022/0055843A1, the disclosure of which is hereby incorporated herein by reference in its entirety.

The tray loading system 200 is operable to load a tray 106 in the following manner. A tray 106 is conveyed along the upstream tray conveyor 204 and then transferred from the conveyor surface 204a to the transfer bed 214 with the transfer surface 214a substantially coplanar with the upstream tray conveyor. Once the tray is substantially supported on the transfer bed 214, the support elements 226 of the lifting apparatus raise upward and engage the transport plate 124 through the aperture 122 while the tray frame 116 remains at the transport surface 214a of the transfer bed 214. With the transport plate 124 in the receiving position, the article conveyor 210 transports and then transfers an article 112 from the conveyor surface 210a to the transport surface 124a of the tray 106. With the article supported at the transport plate 124, the support elements 226 lower down and the transport plate 124 lowers until it engages or rests on the base 120 of the tray frame 116. With the tray 106 in the transport position the transfer bed 214 transfers the tray 106 with the article 112 from the transport surface 214a to the conveyor surface 208a of the downstream tray conveyor 208 which then transports the tray away from the transfer bed 214. The transfer bed 214 is then ready to receive an empty tray 106 from the upstream conveyor 204 for loading of another article 112.

Figure 10:
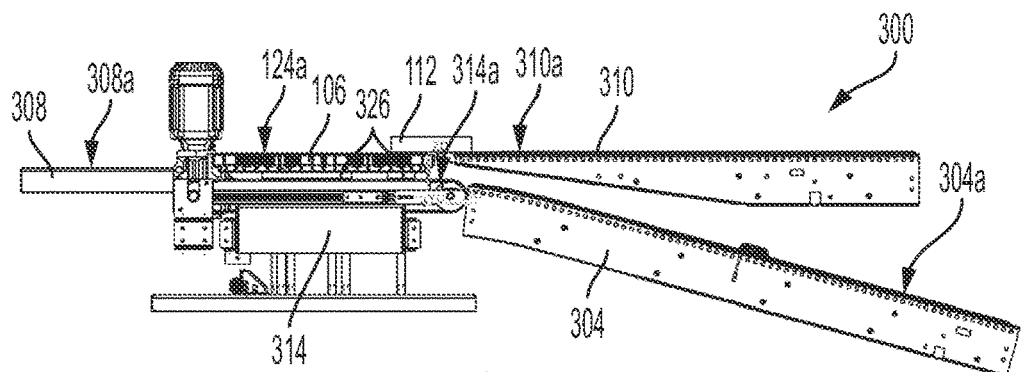
FIG. 10 is a side elevation view of another tray loading system in accordance with the present invention, depicted with a lift apparatus in a lifted or raised position.
Figure 11:
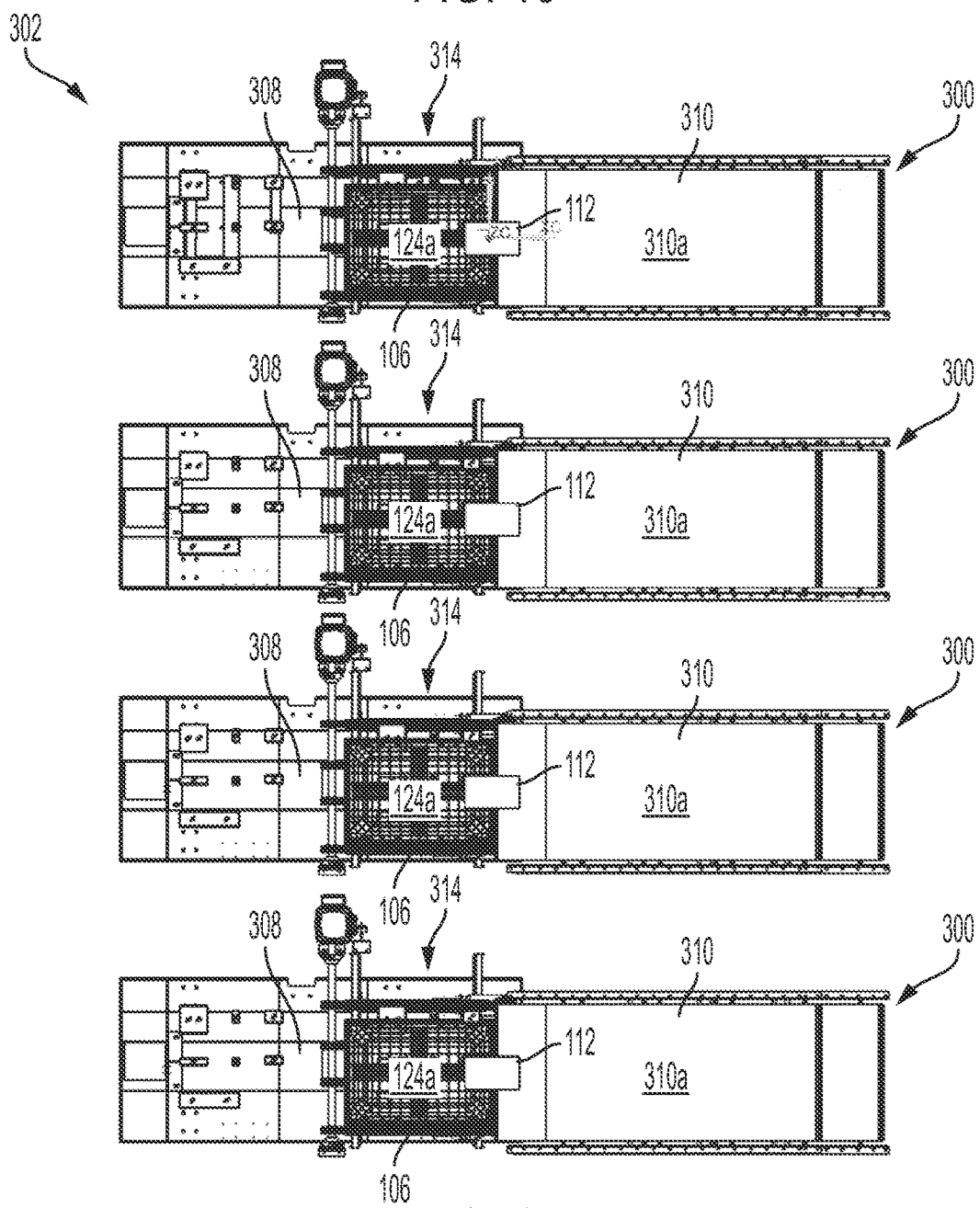
FIG. 11 is a top plan view of a plurality of the tray loading systems of FIG. 10.

Referring to the illustrative embodiments of FIGS. 10-11, a tray loading system 300 is provided for a material handling system 302 having a first or upstream tray conveyor 304 for transporting material handling transport trays 106 (as previously described above and illustrated in FIGS. 5-7), a second or downstream tray conveyor 308 for transporting trays 106, and an upstream article conveyor 310 for transporting articles or items 112. The tray loading system 300 includes similar components as the tray loading system 200 described above and illustrated in FIGS. 8 and 9, and functions in a substantially similar manner as tray loading system 200, with significant differences discussed below. Tray loading system 300 includes a transfer bed 314 for facilitating a transfer of an article 112 from the article conveyor 310 to a tray 106 supported at the transport surface 314a of the transfer bed 314. The upstream tray conveyor 304 delivers trays 306 to the transfer bed 314 and the downstream tray conveyor 308 transports trays 106 away from the transfer bed 314.

The transfer bed 314 is positioned downstream of the upstream tray conveyer 304 and includes a transport or support surface 314a for supporting the frame 316 of a tray 106 at the transfer bed 314. In the illustrated embodiment of FIGS. 10-11, the upstream tray conveyor 304 is oriented at an oblique angle relative to horizontal, as shown in FIG. 10, and the downstream tray conveyor 308 and article conveyor 310 are each oriented horizontally. The transport surface 314a of transfer bed 314 is generally at about an equal height with the discharge end or the conveyor surface 304a of the upstream tray conveyor 304 and is generally parallel and coplanar with the conveyor surface 308a of the downstream tray conveyor 308 (FIG. 10). The discharge end of the article conveyor 310 is positioned substantially superjacent to the discharge end of the upstream tray conveyor 304. In comparison to the relatively large height difference between conveyor surfaces 204a and 210a of tray loading system 200, the height difference between the discharge ends of conveyor surfaces 304a and 310a of tray loading system 300 is relatively small, as illustrated in FIG. 10. As such, enough space is provided for a tray 106 to pass freely between the conveyor surface 304a and a support frame of the article conveyor 310 to the transfer bed 314 without requiring a significant height difference between the upstream tray conveyor 304 and article conveyor 310.

The transfer bed 314 includes a lift apparatus, in the form of a plurality of vertically movable support elements 326 that are raiseable to extend or reach through openings or voids in the transport surface 314a of the transfer bed 314 to engage the transport plate 124 of the tray 106 through the aperture 122 (FIG. 10). The support elements 326 are provided to lift the transport plate 124 of a tray 106 supported on transfer bed 314 to a receiving position that is substantially coplanar to the conveyor surface 310a of the article conveyor 310 (FIG. 10). As the support elements 326 raise, they lift the transport plate 124 of the tray 106 above the peripheral raised edge 118 of the tray 106 and the frame 116 of the tray remains on the transport surface 314a of the transfer bed 314. In comparison to the movement length of the vertically movable support elements 226 of tray loading system 200, the vertically movable support elements 326 of tray loading system 300 are movable through a significantly shorter length, as the movement requirements for raising the transport plate 124 of the tray to the height of the conveyor surface 310a of article conveyor 310 is significantly shorter.

The support elements are operable to position the transport plate 124 at the receiving position in which the transport surface 124a of the plate is horizontal and at or about coplanar with the conveyor surface 310a of the article conveyor 310. The height of the transport surface 124a of the transport plate 124 in the receiving position is set in order to reduce or substantially eliminate impact forces to articles 112 as they transfer from the transport surface 310a of article conveyor 310 to the tray 106. Optionally, the height difference between the transport surface 124a of the transport plate 124 and the conveyor surface 310a of the article conveyor 310 is about ten millimeters (10 mm) or less such that the article 112 drops ten millimeters or less to the tray 106. Optionally, the height difference is about five millimeters (5 mm) or less such that the article 112 drops five millimeters or less to the tray 106. In the receiving position, the transport surface 124a of the transport plate 124 is substantially above the raised edge 118 of the frame 116 of the tray 106. With the lifting apparatus 326 at transfer bed 314 lowered, a tray 106 supported at the transfer bed 314 is positioned in a transport position in which the transport plate 124 of the tray is supported on the base 120 of the frame 116 (i.e. the transport surface 124a of the plate is below the raised edge 118 of the frame 116). The lift apparatus of transfer bed 314 may be similar or substantially identical in structure and function to the exemplary de-traying apparatus disclosed in previously mentioned U.S. Patent Application Pub. No. 2022/0055843A1, the disclosure of which is hereby incorporated herein by reference in its entirety.

The tray loading system 300 is operable to load a tray 106 in the following manner. A tray 106 is conveyed along the upstream tray conveyor 304 and then transferred from the conveyor surface 304a to the transfer bed 314 with the tray 106 traveling in slightly upward direction along the upstream tray conveyor 304 and then transferring to the horizontal transport surface 314a of the transfer bed 314. Once the tray is substantially supported on the transfer bed 314, the support elements 326 of the lifting apparatus raise upward and engage the transport plate 124 through the aperture 122 while the tray frame 116 remains at the transport surface 314a of the transfer bed 314. With the transport plate 124 lifted into the receiving position, the article conveyor 310 transports and then transfers an article 112 from the conveyor surface 310a to the transport surface 124a of the tray 106. With the article supported at the transport plate 124, the support elements 326 lower down and the transport plate 124 lowers until it engages or rests on the base 120 of the tray frame 116. With the tray 106 in the transport position, the transfer bed 314 transfers the tray 106 with the article 112 from the transport surface 314a to the conveyor surface 308a of the downstream tray conveyor 308 which then transports the tray away from the transfer bed 314. The transfer bed 314 is then ready to receive an empty tray 106 from the upstream conveyor 304 for loading of another article 112.

Figure 12:
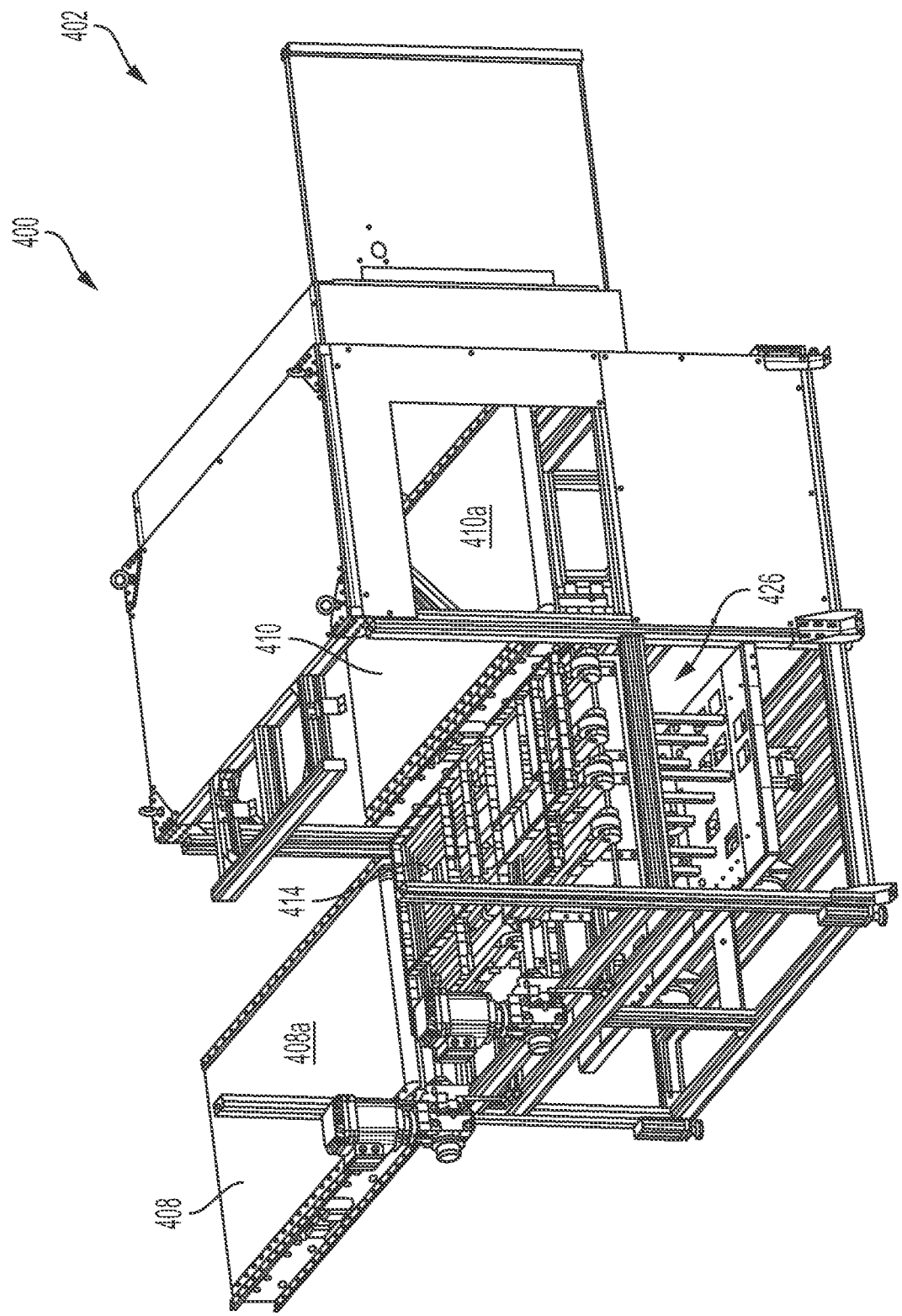
FIG. 12 is a front side perspective view of another tray loading system in accordance with the present invention, depicted with a pair of lateral pushers in a retracted position.
Figure 13:
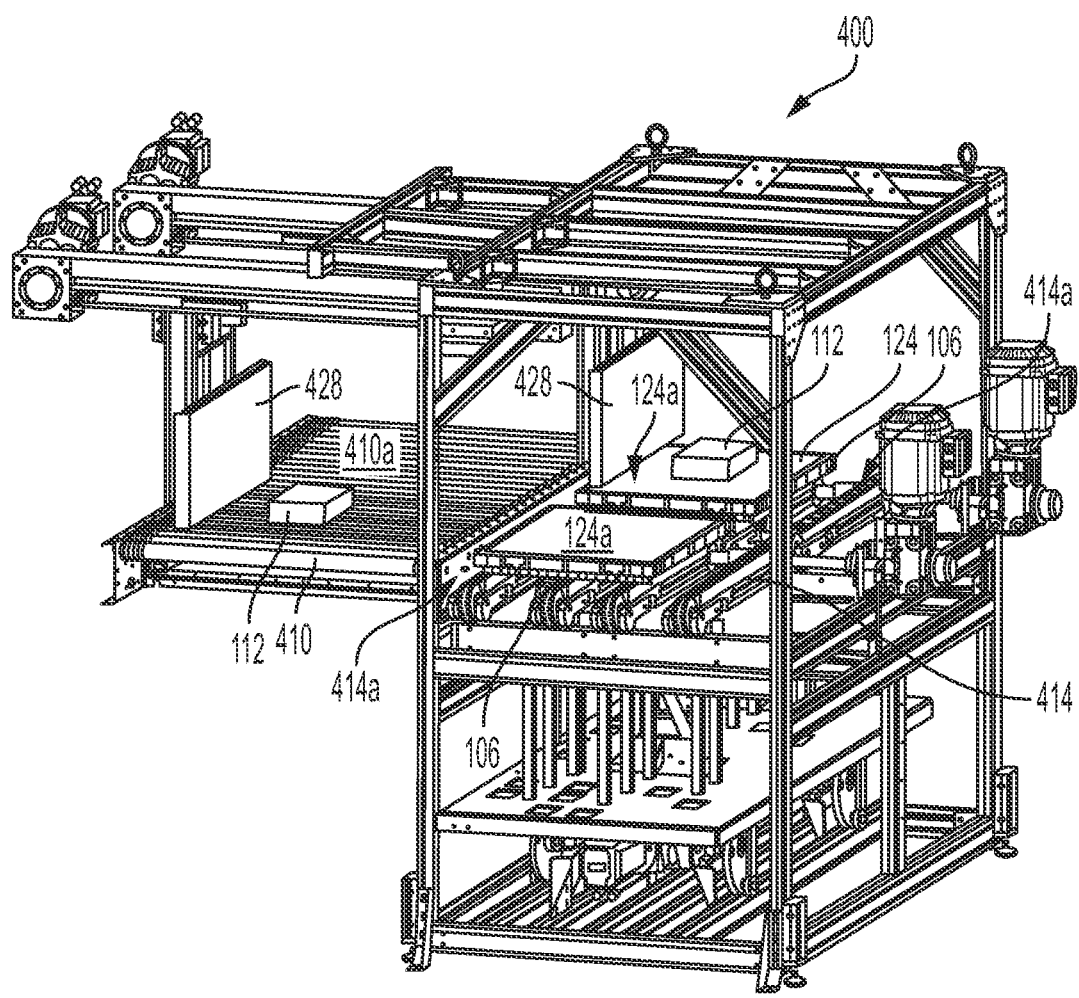
FIG. 13 is a rear side perspective view of the tray loading system of FIG. 12, depicted with a downstream one of the pair of lateral pushers in an extended position.
Figure 13A:
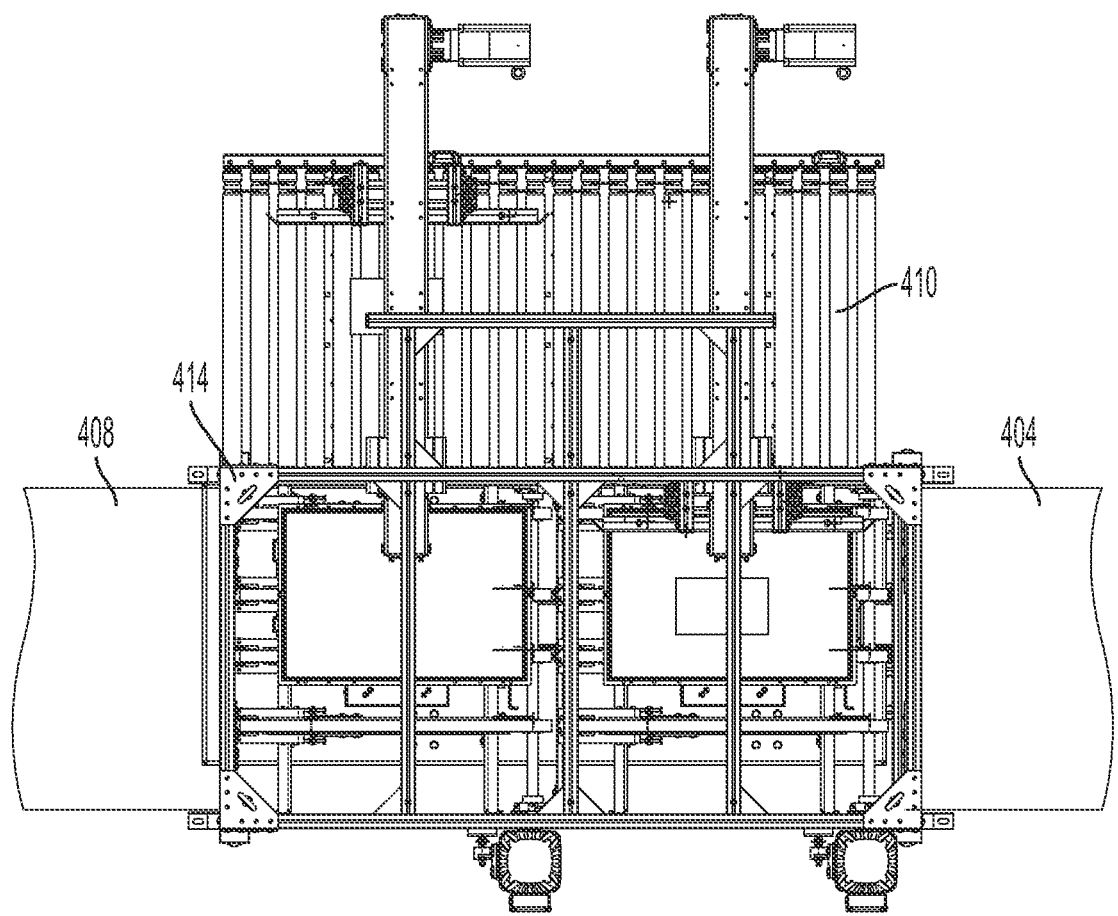
FIG. 13A is a plan view of the loading system of FIGS. 12 and 13 showing the upstream and downstream conveyors.

Referring to the illustrative embodiments of FIGS. 12-13, and 13A, a tray loading system 400 is provided for a material handling system 402 having a first or upstream tray conveyor 404 for transporting material handling transport trays 106 (as previously described above and illustrated in FIGS. 5-7), a second or downstream tray conveyor 408 for transporting trays 106, and an upstream article conveyor 410 for transporting articles or items 112. The tray loading system 400 includes similar components as the tray loading systems 200 and 300 described above and illustrated in FIGS. 8-9 and 10-11, and functions in a substantially similar manner as tray loading systems 200 and 300, with the differences discussed below. The tray loading system 400 includes a transfer bed 414 for facilitating a transfer of an article 112 from the article conveyor 410 to a tray 106 supported at the transport surface 414a of the transfer bed 414. The upstream tray conveyor 404 delivers trays 406 to the transfer bed 414 and the downstream tray conveyor 408 transports trays 106 away from the transfer bed 414.

The transfer bed 414 is positioned downstream of the upstream tray conveyer 404 and includes a transport or support surface 414a for supporting the frame 416 of a tray 106 at the transfer bed 414. In the illustrated embodiment of FIGS. 12-13, the upstream tray conveyor 404, downstream tray conveyor 408, and article conveyor 410 are each oriented horizontally. The transport surface 414a of transfer bed 414 is generally parallel and coplanar with the conveyor surface of the upstream tray conveyor 404 and downstream tray conveyor 408 to smoothly (i.e. with little or no impact and/or vertical shifting) receive a tray 106 from the upstream tray conveyor 404 and discharge or transfer a tray 106 to the downstream tray conveyor 408. The upstream tray conveyor 404, transfer bed 414, and downstream tray conveyor 408 are each co-linear with each other, i.e. their conveyance directions are the same. The article conveyor 410 is positioned alongside and parallel to transfer bed 414 and parallel to the upstream tray conveyor 404 and downstream tray conveyor 408.

The transfer bed 414 includes a lift apparatus, in the form of a plurality of vertically movable support elements 426 that are raiseable to extend or reach through openings or voids in the transport surface 414a of the transfer bed 414 to engage the transport plate 124 of the tray 106 through the aperture 122, as described above. Vertically movable support elements 426 function similar to that described previously for support elements 226 and 326. The support elements 426 are provided to lift the transport plate 124 of a tray 106 supported on transfer bed 414 to a receiving position that is substantially coplanar to the conveyor surface 410a of the adjacent article conveyor 410. As the support elements 426 raise they lift the transport plate 124 of the tray 106 above the peripheral raised edge 118 of the tray 106 and the frame 116 of the tray remains on the transport surface 414a of the transfer bed 414. As best seen in FIG. 13, the tray loading system 400 includes a lateral transfer apparatus including a pair of pushers 428 operable to push articles 112 laterally from the conveyor surface 410a of the article conveyor 410 onto the transport surface 124a of the transport plate 124 of a tray 106 supported at the transfer bed 414.

Similar to the function of transfer bed 314 and the support elements 326 of tray loading system 300, the support elements 426 of system 400 are operable to position the transport plate 124 at the receiving position in which the transport surface 124a of the plate is at or about coplanar with the conveyor surface 410a of the article conveyor 410. The height of the transport surface 124a of the transport plate 124 in the receiving position is set in order to reduce or substantially eliminate impact forces to articles 112 as they transfer from the transport surface 410a of article conveyor 410 to the tray 106. Optionally, the height difference between the transport surface 124a of the transport plate 124 and the conveyor surface 410a of the article conveyor 410 is about ten millimeters (10 mm) or less such that the article 112 drops ten millimeters or less to the tray 106. Optionally, the height difference is about five millimeters (5 mm) or less such that the article 112 drops five millimeters or less to the tray 106. In the receiving position, the transport surface 124a of the transport plate 124 is substantially above the raised edge 118 of the frame 116 of the tray 106. With the lifting apparatus 426 at transfer bed 414 lowered, a tray 106 supported at the transfer bed 414 is positioned in a transport position in which the transport plate 124 of the tray is supported on the base 120 of the frame 116 (i.e. the transport surface 124a of the plate is below the raised edge 118 of the frame 116). The lift apparatus of transfer bed 414 may be similar or substantially identical in structure and function to the exemplary de-traying apparatus disclosed in previously mentioned U.S. Patent Application Pub. No. 2022/0055843A1, the disclosure of which is hereby incorporated herein by reference in its entirety.

The tray loading system 400 is operable to load a tray 106 in the following manner. A tray 106 is conveyed along the upstream tray conveyor 404 and then transferred from the conveyor surface 404a to the transfer bed 414 with the transfer surface 414a substantially coplanar with the conveyor surface of the upstream tray conveyor 404. Once the tray 106 is substantially supported on the transfer bed 414, the support elements 426 of the lifting apparatus raise upward and engage the transport plate 124 through the aperture 122 while the tray frame 116 remains at the transport surface 414a of the transfer bed 414. The article conveyor 410 transports an article 112 to a position adjacent or proximate the transfer bed 414. With the transport plate 124 in the receiving position, one of the pair of pushers 428 pushes the article 112 from the conveyor surface 410a of article conveyor 410 to the transport surface 124a of the tray 106. With the article supported at the transport plate 124, the support elements 426 lower down and the transport plate 124 lowers until it engages or rests on the base 120 of the tray frame 116. With the tray 106 in the transport position, the transfer bed 414 transfers the tray 106 with the article 112 from the transport surface 414a to the conveyor surface 408a of the downstream tray conveyor 408 which then transports the tray away from the transfer bed 414. The transfer bed 414 is then ready to receive an empty tray 106 from the upstream conveyor 404 for loading of another article 112.

Figure 14:
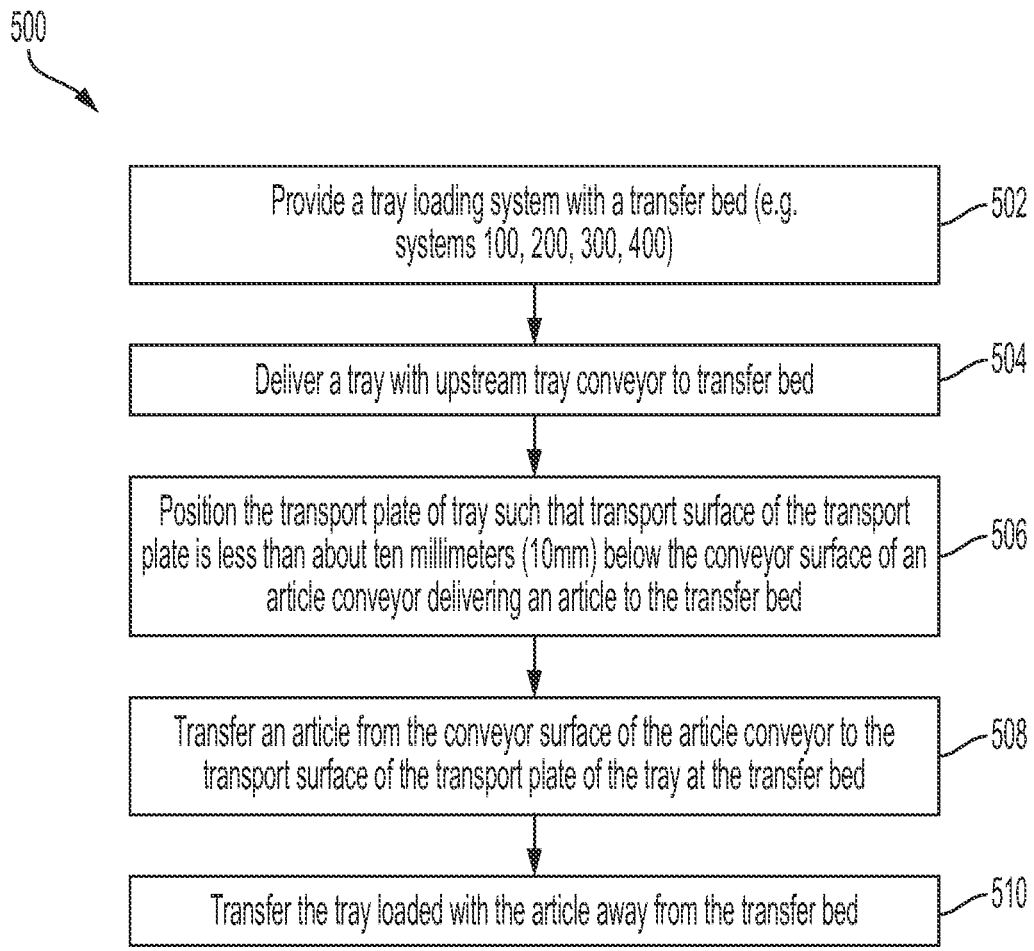
FIG. 14 is a diagram of a method for loading articles onto a tray, in accordance with the present invention.

Referring now to the illustrative embodiment of FIG. 14, a method 500 is provided for loading an article 112 (e.g. a fragile product or item such as fresh tomatoes or glass light bulbs) onto a material handling transport tray 106 in a material handling conveyor system, such as material handling conveyor systems 102, 202, 302, or 402 described above and illustrated in FIGS. 1-4, 8-9, 10-11, and 12-13A. Unless specifically noted otherwise, method 500 is hereinafter described in relation to tray loading system 100 of the illustrative embodiment of FIGS. 1-4. The method 500 includes providing 502 a first or upstream tray conveyor 104, an article conveyor 110 adjacent the first tray conveyor, a tray 106 (see FIGS. 5-7) including a frame 116 having a peripheral raised edge 118 and a base 120 having at least one aperture 122, and a transport plate 124 with a transport surface 124a for supporting articles 112. The transport plate 124 is supportable on the base 120 of the frame 116 for transport and is moveable relative to the raised edge 118 and base 120 of the frame 116. A transfer bed 114 is provided at 502 to receive the tray 106 from the upstream tray conveyor 104 and is operable to position the transport plate 124 of the tray 106 at a receiving position to receive an article 112 from the conveyor surface 110a of the article conveyor 110, optionally with a drop of less than about ten millimeters (10 mm) and optionally less than about five millimeters (5 mm). Method 500 includes delivering 504 a tray with the upstream tray conveyor to the transfer bed 114 and positioning 506 the transport plate 124 of the tray 106 at the transfer bed 114 such that the transport surface 124a of the transport plate 124 is less than about ten millimeters (10 mm) (or less than about five millimeters (5 mm)) below the conveyor surface 110a of the article conveyor 110. An article 112 is transferred 508 from the conveyor surface 110a of the article conveyor 110 to the transport surface 124a of the transport plate 124 of the tray 106 at the transfer bed 114. Once the article 112 is loaded onto the tray, the loaded tray is transferred 510 away from the transfer bed 114. Optionally, a second or downstream tray conveyor 108 is provided downstream of the transfer bed 114 to transfer 510 the loaded tray away from the transfer bed. Positioning the transport plate of the tray at 506 may include operating a lift apparatus to move either the frame 116 of the tray 106 or the transport plate 124 of the tray 106 relative to the other.

When method 500 is performed with tray loading systems similar to tray loading system 100 of the illustrative embodiment of FIGS. 1-4, positioning the transport plate 124 includes pivoting or lowering the transfer bed 114 downward from its oblique orientation to its horizontal orientation. Accordingly, lowering the frame 116 of the tray 106 relative to the support elements permits the frame 116 to lower relative to the transport plate 124 of the tray. The transport plate 124 remains in substantially the same position relative to the support elements.

When method 500 is performed with tray loading systems similar to tray loading system 200, 300, or 400 of the illustrative embodiments of FIG. 8-9, 10-11, or 12-13, positioning the transport plate 124 includes operating the lift apparatus to move the transport plate 124 to a receiving position such that the transport surface 124a is substantially coplanar to the conveyor surface 110a of the article conveyor 110 (or less than about five millimeters (5 mm)). Optionally, the transport plate 124 is positioned to receive an article 112 from the article conveyor 110 with less than about ten millimeters (10 mm) (or less than about five millimeters (5 mm)) drop to the transport plate 124. Operating the lift apparatus may include raising the plurality of support elements 226, 326, or 426 such that they lift the transport plate 124 of the tray 106 such that the transport surface 124a is at or above the peripheral raised edge 118 of the tray and the frame 116 of the tray remains substantially on the transport surface 114a of the transfer bed 114.

When method 500 is performed with tray loading systems similar to tray loading system 400 of the illustrative embodiment of FIGS. 12-13, the transferring 508 an article from the conveyor surface 410a of the article conveyor 410 to the transport surface 124a of the transport plate 124 includes pushing the article 112 with one of the pushers 428 from the conveyor surface 410a onto the transport surface 124a.

Thus, the tray loading systems 100, 200, 300, and 400, and the method 500 are especially suited for loading fragile articles onto transport trays within a material handling conveyor system, though they are not so limited. The tray loading systems include transfer beds with lifting systems, which position transport plates of the trays near the height of the conveyor surface of the article conveyor in a manner that reduces or substantially eliminates dropping forces when the articles transfer from the article conveyor onto the tray.

Changes and modifications in the specifically described embodiments can be carried out without departing from the principles of the present invention, which is intended to be limited only by the scope of the appended claims, as interpreted according to the principles of patent law including the doctrine of equivalents.

The invention claimed is:

1. A tray loading system for loading articles onto trays in a material handling conveyor system, said tray loading system comprising:

a first tray conveyor having a conveyor surface and being operable to transport a material handling transport tray in a conveyor direction for loading, wherein said material handling transport tray comprises:
  a frame having a peripheral raised edge and a base having at least one aperture; and
  a transport plate with a transport surface for supporting articles, wherein said transport plate is supportable on said base of said frame for transport and is moveable relative to said raised edge and said base of said frame;

a transfer bed adjacent and downstream of said first tray conveyor and having a transport surface configured to receive said material handling transport tray from said first tray conveyor;

an article conveyor adjacent said transfer bed and said first tray conveyor, said article conveyor having a conveyor surface and being operable to transport an article in the conveyor direction and to transfer the article from said conveyor surface of said article conveyor onto said transport surface of said material handling transport tray when supported at a portion of said transfer bed;

a second tray conveyor downstream of said transfer bed having a conveying surface and being operable to transport said material handling transport tray in the conveyor direction away from said transfer bed;

said transfer bed operable to position said material handling transport tray in a receiving position wherein said transport plate of said material handling transport tray is at or above said raised edge of said frame of said material handling transport tray and such that said transport surface of said transport plate is substantially parallel with said conveyor surface of said article conveyor; and said transfer bed operable to position said material handling transport tray in a transport position wherein said transport plate of said material handling transport tray is supported on said base of said frame.

2. The tray loading system of claim 1, wherein said transport surface of said transport bed is substantially parallel and coplanar with said conveyor surfaces of said first and second tray conveyors and is substantially parallel and subjacent to said conveyor surface of said article conveyor.

3. The tray loading system of claim 2, wherein said transfer bed comprises a lift apparatus operable to lift said transport plate of said material handling transport tray supported on said transfer bed to a position substantially coplanar to the conveyor surface of said article conveyor such that said transport plate is positioned to receive the article from said article conveyor with ten millimeters (10 mm) or less drop to said transport plate.

4. The tray loading system of claim 3, wherein said lift apparatus comprises a plurality of vertically moveable support elements configured to reach through the transport surface of said transfer bed and the aperture in said material handling transport tray such that as said plurality of support elements raise they lift said transport plate of said material handling transport tray supported at said transfer bed above said peripheral raised edge of said tray and said frame of said material handling transport tray remains on said transport surface of said transfer bed.

5. The tray loading system of claim 1, further comprising a pusher operable to push articles laterally from said conveyor surface of said article conveyor onto said transport surface of said transport plate of said material handling transport tray supported at said transfer bed.

6. A tray loading system for loading articles onto trays in a material handling conveyor system, said tray loading system comprising:
a first tray conveyor operable to transport a material handling transport tray in a conveyor direction for loading, said material handling transport tray comprising:
a frame having a peripheral raised edge and a base having at least one aperture; and
a transport plate with a transport surface for supporting articles, wherein the transport plate is supportable on said base of said frame for transport and is moveable relative to said raised edge and said base of said frame;
a transfer bed downstream of said first tray conveyor and configured to receive said material handling transport tray from said first tray conveyor;
an article conveyor upstream of said transfer bed and superjacent to said first tray conveyor, said article conveyor operable to transport an article in the conveyor direction and to transfer the article from the conveyor surface of said article conveyor onto the transport surface of the material handling transport tray when supported at a portion of said transfer bed; and
a second tray conveyor downstream of said transfer bed and operable to transport said material handling transport tray in the conveyor direction away from said transfer bed;
said transfer bed operable to position the tray in a substantially level orientation wherein the transport plate of the material handling transport tray is at or above the raised edge of the frame of the material handling transport tray and such that the transport surface of the transport plate is substantially parallel with the conveyor surface of said article conveyor; and
said transfer bed operable to position the material handling transport tray such that the transport plate of the material handling transport tray is substantially parallel to a conveyor surface of the downstream said second tray conveyor that is operable to transport the material handling transport tray from said transfer bed.

7. The tray loading system of claim 6, wherein said transfer bed is pivotable about a horizontal axis and operable to move between (i) a horizontal orientation in which the transport plate of material handling transport tray supported at said transfer bed is horizontal and substantially parallel with the conveyor surface of said article conveyor to receive the article from said article conveyor with 10 millimeters (10 mm) or less drop to the transport plate, and (ii) an oblique orientation in which the transport plate of said material handling transport tray supported at said transfer bed is obliquely oriented relative to horizontal and substantially parallel with the conveyor surface of said second tray conveyor to transfer said material handling transport tray from said transfer bed to said second tray conveyor.

8. The tray loading system of claim 6, wherein said transfer bed comprises a lift apparatus configured to position the transport plate of a horizontally orientated said material handling transport tray supported on a transport surface of said transfer bed at or above the peripheral raised edge of the frame of the material handling transport tray.

9. The tray loading system of claim 8, wherein said lift apparatus comprises a plurality of support elements fixed relative to said first tray conveyor and said article conveyor and configured to reach through the transport surface of said transfer bed and the aperture in the material handling transport tray as the frame of the material handling transport tray is lowered relative to said support elements such that the frame lowers relative to said transport plate of the material handling transport tray.

10. The tray loading system of claim 6, wherein a transport surface of said transfer bed is positioned substantially parallel with the conveyor surface of said first tray conveyor to receive said material handling transport tray from said first tray conveyor.

11. The tray loading system of claim 10, wherein said transfer bed comprises a lift apparatus operable to lift the transport plate of a horizontally orientated said material handling transport tray supported on said transfer bed to a position substantially coplanar to the conveyor surface of said article conveyor such that said transport plate is positioned to receive the article from said article conveyor with 10 millimeters (10 mm) or less drop to the transport plate.

12. The tray loading system of claim 11, wherein said lift apparatus comprises a plurality of vertically moveable support elements configured to reach through the transport surface of said transfer bed and the aperture in the material handling transport tray such that as said plurality of support elements raise they lift the transport plate of the material handling transport tray supported at said transfer bed above the peripheral raised edge of the tray and the frame of the tray remains on the transport surface of said transfer bed.

13. The tray loading system of claim 6, wherein the conveyor surfaces of said first tray conveyor and said article conveyor are each substantially horizontal.

14. The tray loading system of claim 6, wherein the conveyor surface of at least one of said first tray conveyor and said article conveyor is obliquely oriented relative to horizontal.

* * * * *

UNITED STATES PATENT AND TRADEMARK OFFICE
CERTIFICATE OF CORRECTION

| | | |
|---|---|---|
| PATENT NO. | : 12,415,682 B2 | Page 1 of 1 |
| APPLICATION NO. | : 18/307424 | |
| DATED | : September 16, 2025 | |
| INVENTOR(S) | : Jared Hills et al. | |

It is certified that error appears in the above-identified patent and that said Letters Patent is hereby corrected as shown below:

In the Claims

Column 14
Claim 7, Line 8, insert --said-- after "plate of"

Signed and Sealed this
Twenty-eighth Day of October, 2025

John A. Squires
*Director of the United States Patent and Trademark Office*